2,128,854

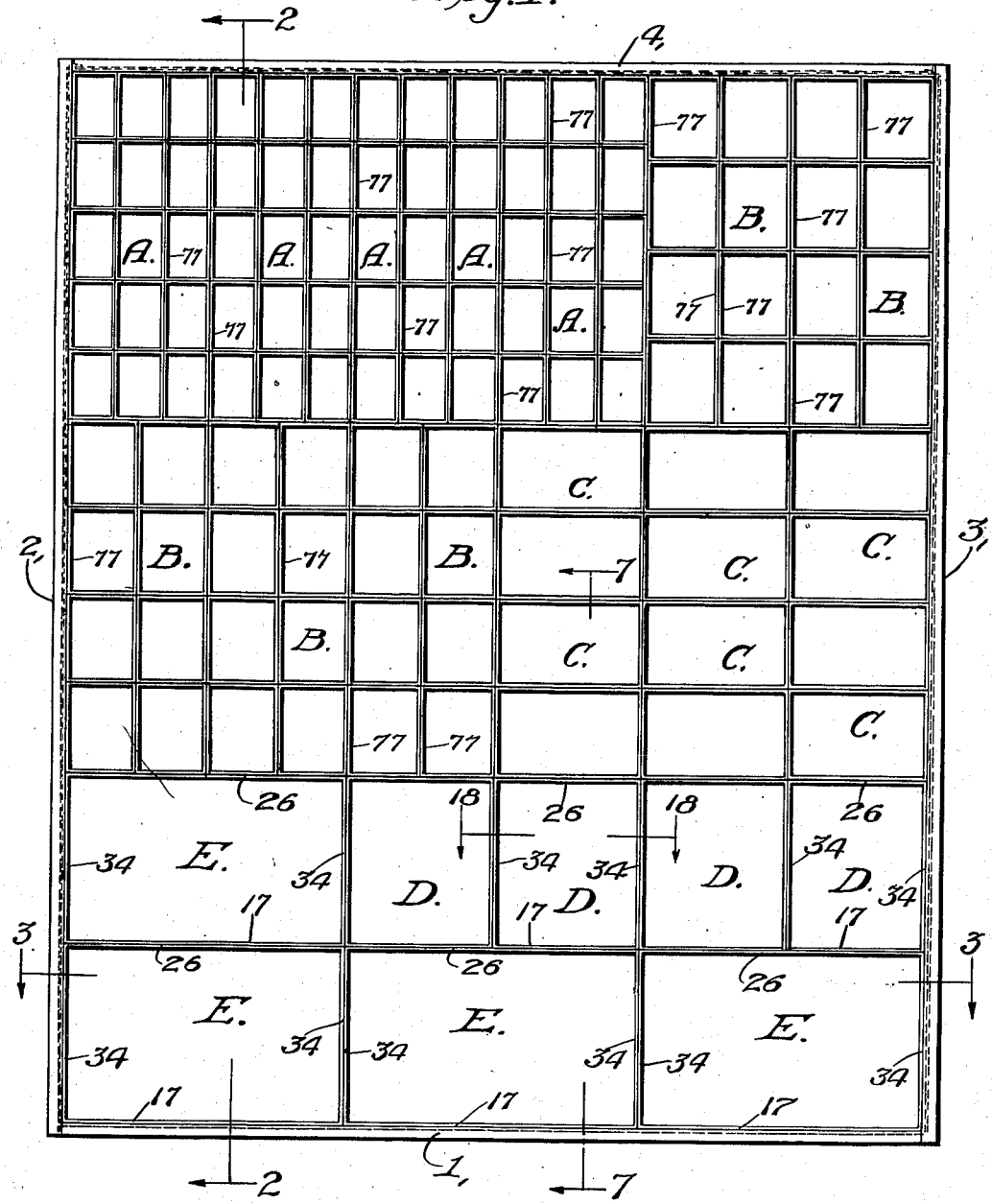

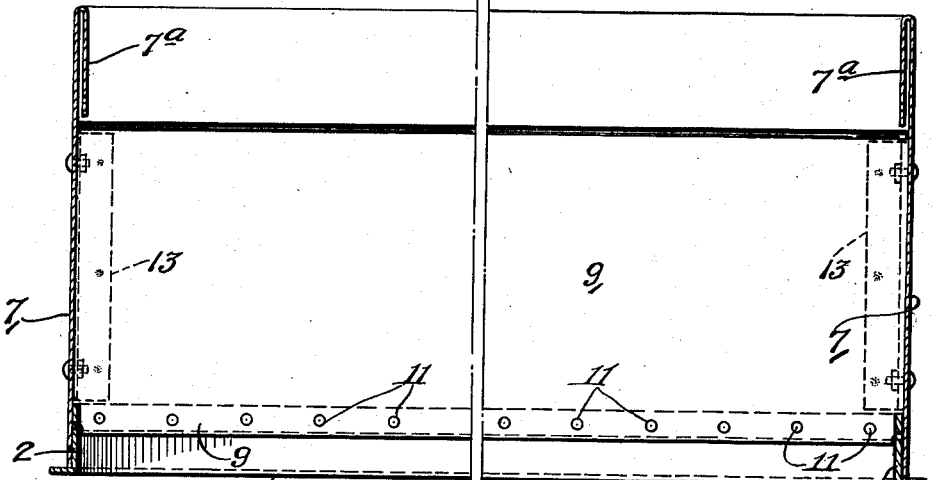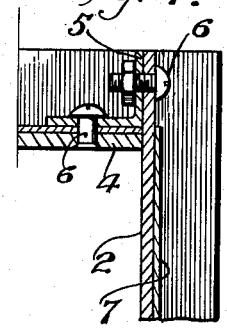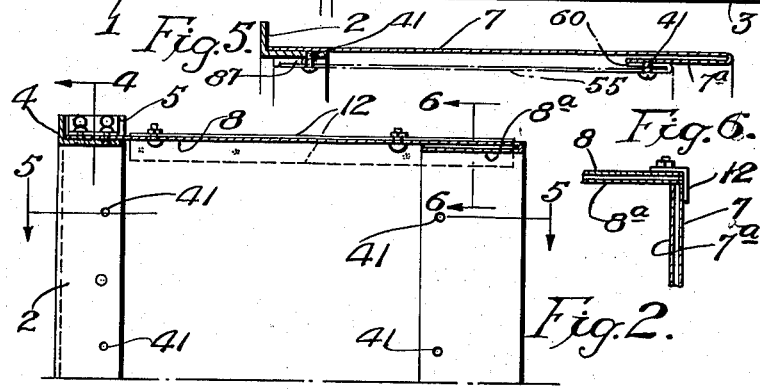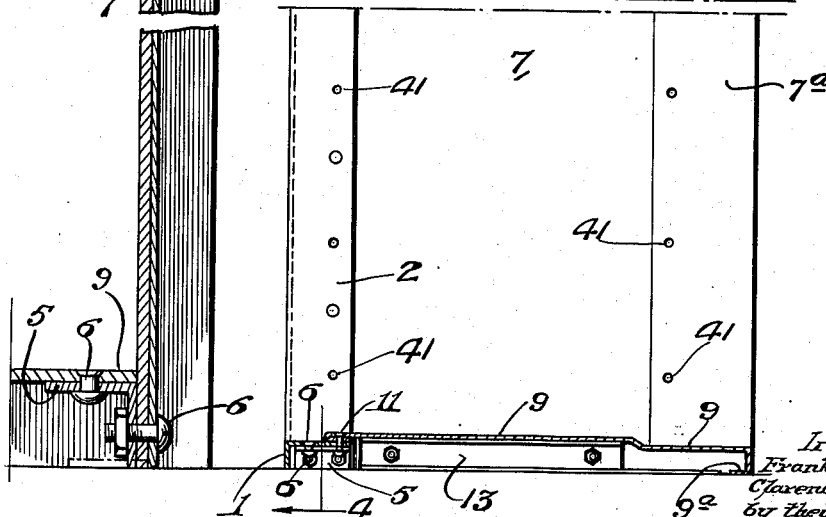

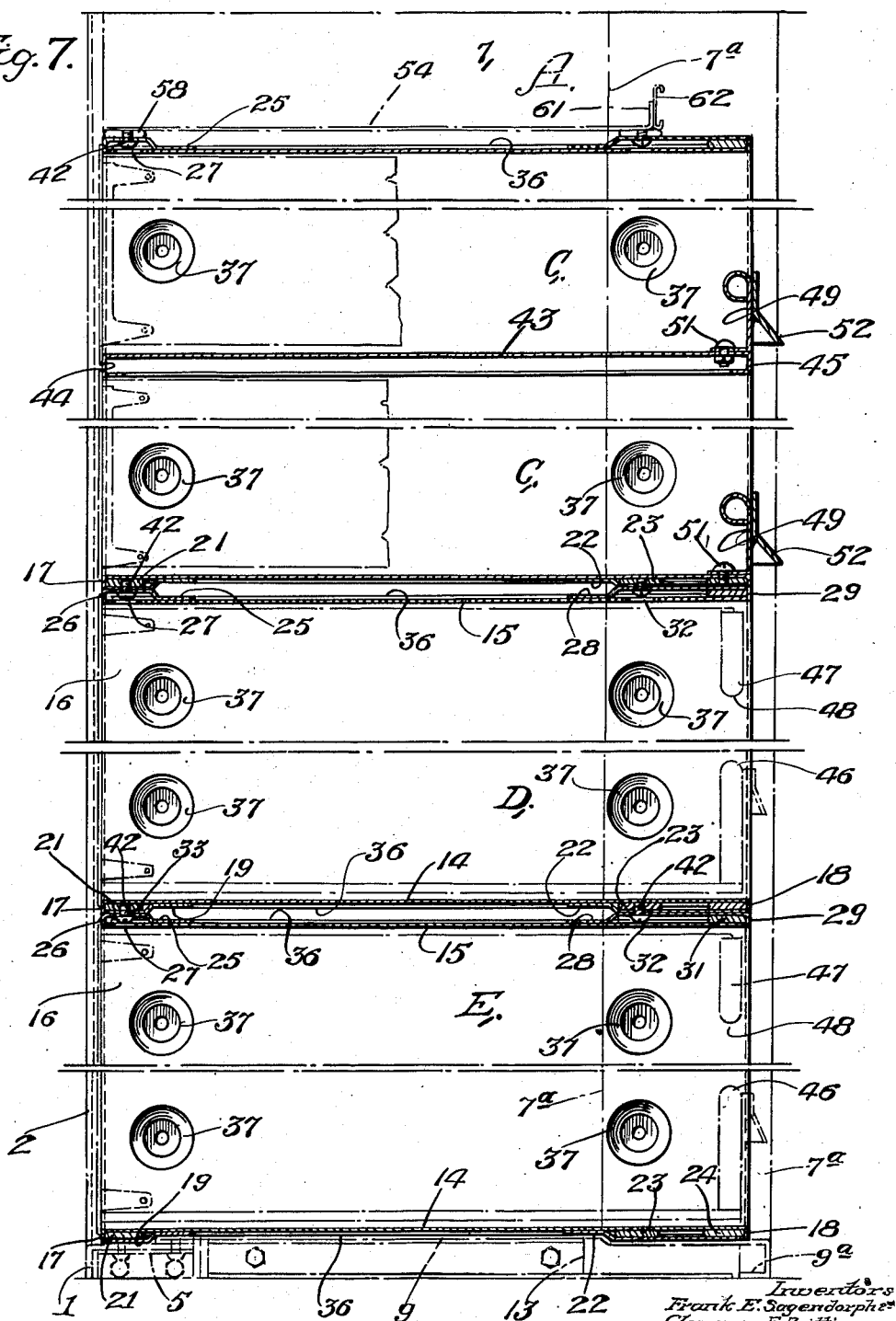

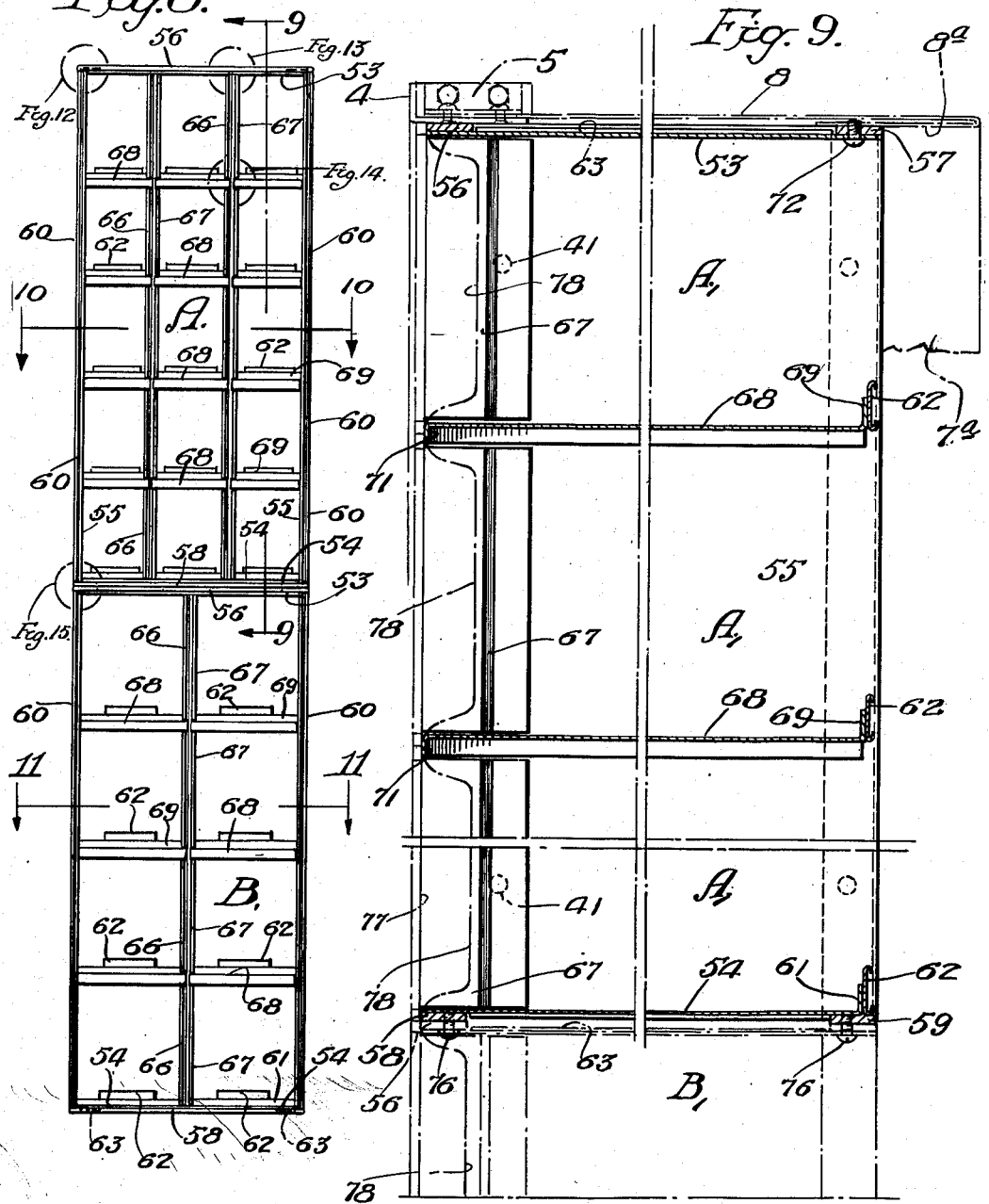

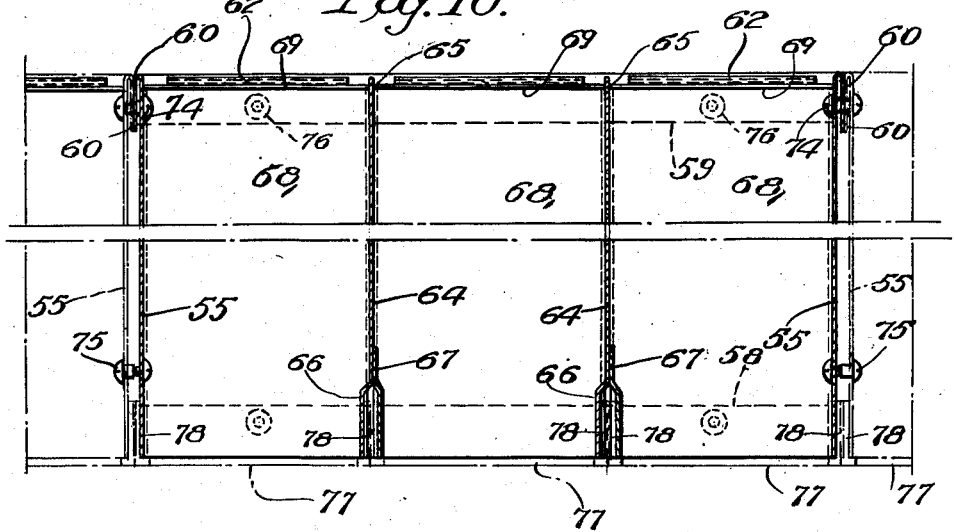
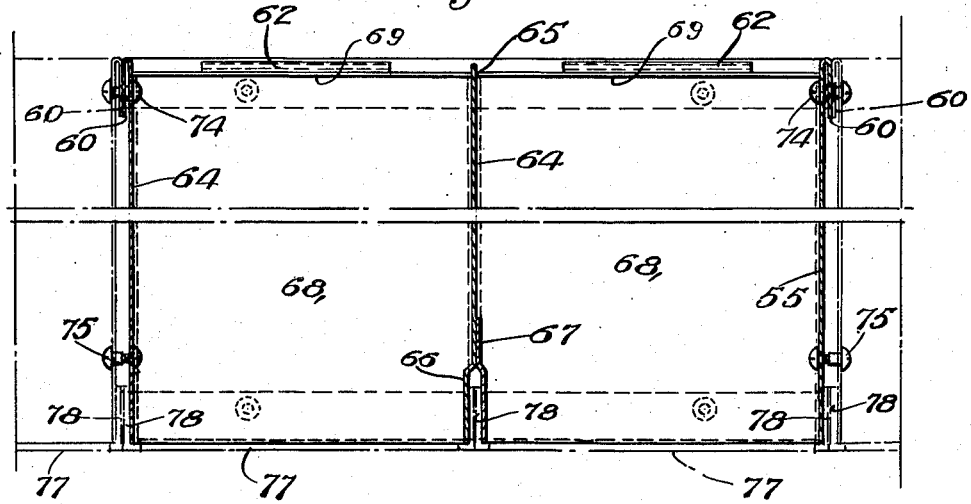

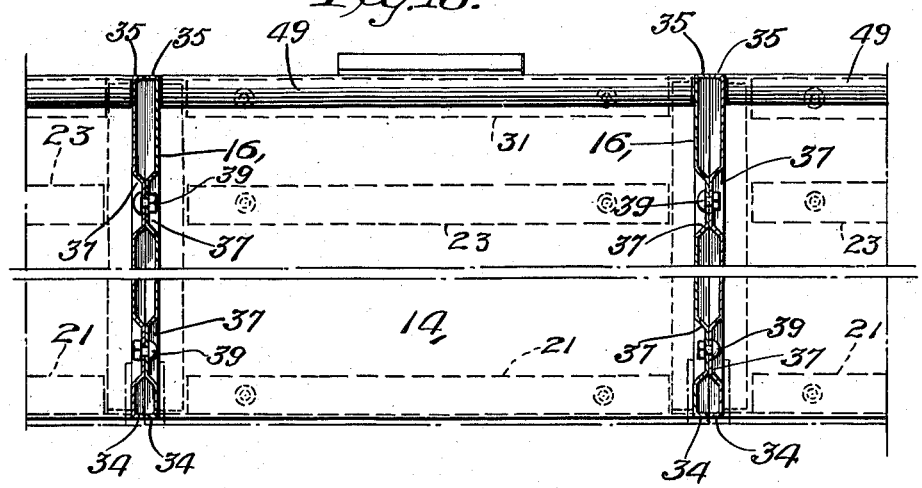
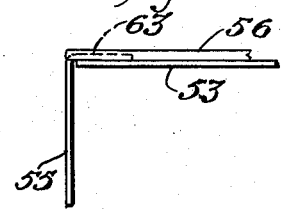
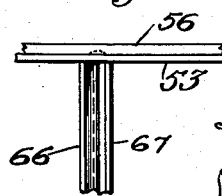
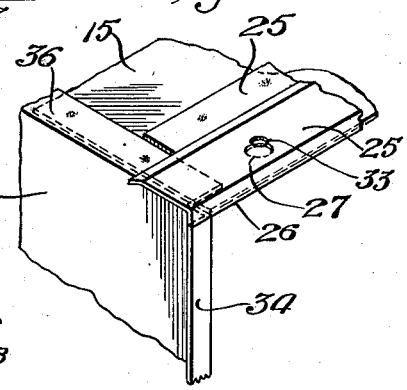
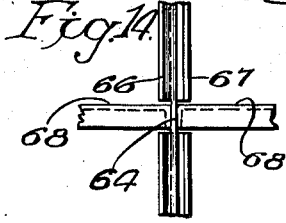
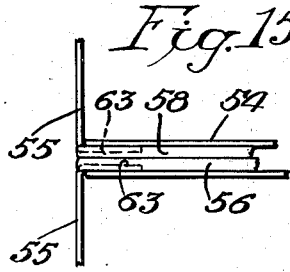
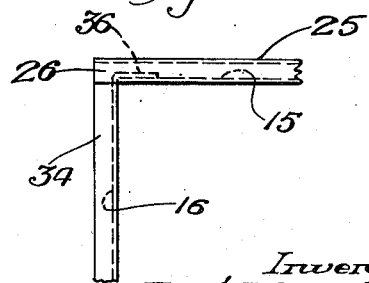
Inventors:
Frank E. Sagendorph 2nd
Clarence E. Baittinger
by their Attorneys
Howson & Howson Patented Aug. 30, 1938

UNITED STATES PATENT OFFICE 2,128,854

POST OFFICE BOX STRUCTURE

Frank E. Sagendorph, 2nd, Lansdowne, and Clarence E. Baittinger, Philadelphia, Pa., assignors to Penn Metal Corporation of Penna., Philadelphia, Pa., a corporation of Delaware Application April 17, 1937, Serial No. 137,574

8 Claims. (Cl. 312—103)

Our invention relates to certain improvements in letter box structures of the type employed in post offices to provide a number of individual boxes or compartments arranged with one end thereof open to the mail-distributing room and having at the other end a closure provided with a lock and affording access from that end to duly authorized persons.

Prior to our invention these multiple box structures had conventionally been fabricated from wood in units of considerable size, and any changes required in the number of the individual compartments in the unit, or in the relative numbers of compartments of different sizes, have entailed a substantial rebuilding of the entire unit.

The principal object of our invention is to provide a practical form of box structure of this type consisting of an assembly of individual box elements each composed of sheet metal and adapted to be detachably secured together into a major nested unit of relatively large size, said box elements affording a plurality of different sizes of compartments and being so relatively proportioned as to be interchangeable in the assembly, to thereby afford a large degree of flexibility in the choice of number and relative location in the nest of the individual compartments of the different sizes.

Another object of the invention is to provide a structure of the stated character wherein the individual box elements forming the separate compartments or groups of compartments may readily be released from the structure by a duly authorized person and withdrawn for replacement in the space vacated by one or a plurality of the other box elements, this arrangement obviating the necessity for dismantling the nest or major structural unit as a whole, and affording a material economy.

A further object is to provide a structure of the stated character that shall be substantially tamper-proof, as hereinafter more fully described.

Still another object of the invention is to provide a simple and highly economical sheet metal box structure of the stated type, and in this respect the invention resides in certain novel structural details and arrangements hereinafter described and illustrated in the attached drawings, in which:

Figure 1 is a front elevational view of a nest of boxes forming a major unit and made in accordance with our invention;

Fig. 2 is a fragmentary section on the line 2—2, Fig. 1;

Fig. 3 is a fragmentary section on the line 3—3, Fig. 1;

Fig. 4 is a section on the line 4—4, Fig. 2;

Fig. 5 is a section on the line 5—5, Fig. 2;

Fig. 6 is a fragmentary section on the line 6—6, Fig. 2;

Fig. 7 is a fragmentary section on the line 7—7, Fig. 1;

Fig. 8 is a fragmentary front elevational view of two of the sub-units of the assembly shown in Fig. 1;

Fig. 9 is a section on the line 9—9, Fig. 8;

Fig. 10 is a section on the line 10—10, Fig. 8;

Fig. 11 is a section on the line 11—11, Fig. 8;

Figs. 12 to 15, inclusive, are fragmentary views showing details of construction at the various points indicated in Fig. 8;

Fig. 16 is a fragmentary view in perspective showing details of the corner construction of one of the individual box elements;

Fig. 17 is a front elevational view of the portion of the structure shown in Fig. 16, and Fig. 18 is a section on the line 18—18, Fig. 1.

Referring to Fig. 1 of the drawings, we have therein shown a typical box structure or major unit made in accordance with our invention. The actual overall dimensions of this unit may vary in accordance with the requirements of the individual post office, or the complete box structure in any one office may consist of a number of units, such as shown in Fig. 1, or larger or smaller, assembled together. This unitary structure comprises a rectangular casing, see Figs. 3 to 6, inclusive, consisting of four angle bars, 1, 2, 3 and 4, forming the bottom, sides and top of a frame at the front of the casing, these bars being secured together at the corners of the frame by means of angle brackets 5 and bolts or rivets 6, 6. The casing further comprises side plates 7, 7 which are riveted or otherwise secured to the rearwardly extending flanges of the side frame pieces 2 and 3; a top plate 8 similarly secured at its forward edge to the rearwardly extending horizontal flange of the top frame bar 4, and a bottom plate 9 which is secured at its forward edge to the frame by means of rivets 11 or other suitable securing elements, the forward riveted edge of the bottom plate 9 being turned under, as shown in Fig. 2. The adjoining edges of the side plates 7 and the top plate 8 are secured together by means of external angle elements 12, and the bottom plate 9 is similarly secured to the side plates 7 by means of corresponding angle elements 13 secured to the under side of the bottom plate 9 and to the inner faces of the side plates 7.

As shown in Figs. 2, 3 and 5, the rear ends of the side plates 7 and top plate 8 are bent inwardly on themselves, as indicated at 7a and 8a, for purposes hereinafter set forth. It will be noted also by reference to Fig. 2 that the rear edge of the bottom plate 9 is flanged downwardly and inwardly at 9a, the lower edge of this inturned portion occupying the same plane as the lower ends of the side frame bars 2 and 3 and the lower edge of the front vertical flange of the lower cross bar 1. The parts described above form a substantially rigid casing which is adapted to receive the individual box elements which form the letter-receiving compartments shown in Fig. 1. It will be noted that in the sectional views of Figs. 3 to 6, inclusive, these individual box elements have been left out, these views thereby showing only the structural form and details of the outer casing, as described above.

It will be noted by reference to Fig. 1 that the typical unit therein disclosed comprises a plurality of compartments of different sizes which have been identified by the reference letters A, B, C, D and E. The compartments E and D are formed by individual box elements, and these elements are so relatively proportioned that the space occupied by two of the box elements D placed side by side is the same as the space taken up by one of the elements E. The construction of these box elements E and D, which is identical except as to size, is illustrated in Figs. 7 and 16 to 18, inclusive. With reference to these figures, it will be noted that each box comprises bottom and top plates 14 and 15 and side plates 16, 16. The bottom plate 14 has a turned-down flange 17 at the front, see Fig. 7, and a similar turned-down flange 18 at the rear end. Secured to the under side of the plate at the front by welding or other suitable means is a metallic reinforcing strip 19, the forward portion of which is offset downwardly as illustrated to form a space between this strip and the bottom surface of the plate, the forward end of this space being closed by the flange 17. Confined within the space between the offset forward portion of the strip 19, the under surface of the plate 14, and the inner side of the flange 17, is a flat metallic strip 21, the function of which will be hereinafter described. Secured to the under side and at the rear of the bottom plate 14 is a reinforcing plate 22 similar to the plate 19 at the forward end but of somewhat greater width, the plate 22 having a downwardly offset portion which extends to the inner face of the flange 18 and forms a space for reception of two flat metallic strips 23 and 24.

The top plate 15 of the box element extends flatly from front to rear, and this plate has secured at the front end a reinforcing strip 25 having at its forward side an upwardly offset portion which terminates at the front in a depending flange 26. The lower edge of this flange abuts the forward edge of the plate 15, and the flange itself occupies a common plane with the flange 17 of the bottom plate 14. Below the upwardly offset portion of the reinforcing strip 25 the plate 15 is provided with a plurality of apertures 27, the function of which will be hereinafter described. The top plate 15 has at its rear end a metallic reinforcing strip 28 corresponding to the strip 25 at the forward edge but of somewhat greater width, and this strip 28 has at its rearward side an upwardly offset portion which terminates at the rear edge in a depending flange 29, the lower edge of this flange engaging the rear edge of the plate 15. This flange 29 occupies a common plane with the depending flange 18 of the bottom plate 14. In the space between the upwardly offset portion of the strip 28 and the upper surface of the plate 15 and abutting the inner surface of the flange 29 is a flat metallic strip 31. The plate 15 below the forward part of the upwardly offset portion of the strip 28 is provided with a plurality of apertures 32, the function of which will be hereinafter described. Each of the strips 25 and 28 in their upwardly offset portions is provided with a plurality of apertures 33 which are aligned with the apertures 27 and 32 in the plate 15.

Each of the side plates 16 is provided at its forward edge with an outwardly extending flange 34, and similar outwardly extending flanges 35 are provided at the rear edges, the flanges 34 at the front occupying a common plane with the flange 17 of the bottom plate 14 and the flange 26 of the top plate; the flanges 35 at the rear of the side plates occupying a common plane with the flange 18 of the bottom plate and the flange 29 of the top plate. At both top and bottom each of the side plates 16 has an inwardly extending flange 36, and these flanges embrace the side edges of the top and bottom plates 15 and 14 and are suitably secured as by spot-welding to the upper and lower faces of these plates respectively.

With reference to Fig. 16, it will be noted that the reinforcing strips 19 and 22 of the bottom plate and 25 and 28 of the top plate are cut away at the back to permit these flanges 36 to extend substantially to the front edge of the box structure. It will be noted also that the reinforcing strips 19, 22, 25 and 28 extend at their ends beyond the surfaces of the side plates 16 and to the outer edges of the flanges 34 of the side plates. It will be noted further by reference to Fig. 18 that the side plates 16 of the boxes are provided with pressed-out bosses 37, the outer faces of which lie in a plane with the outer edges of the flanges 34 and 35, so that when two of these box elements are placed side by side, the outer edges of the flanges and the outer faces of the bosses 37 on the adjoining boxes lie in contact with each other.

By reference to Fig. 1, it will be noted that the casing of the box structure therein shown, which casing has been previously described, and the box elements E are so relatively proportioned that three of the said box elements fit neatly within the transverse dimensions of the casing. Referring now to Fig. 7, it will be noted that the box elements E at the bottom of the casing which rest upon the bottom wall 9 of the latter have their bottom walls so formed that the shoulders at the inner ends of the downwardly offset portions of the strips 19 and 22 respectively engage the shoulder formed by the turned-under forward edge of the bottom plate 9 and by the depressed portion at the rear end of this plate, so that the box elements in effect are anchored by these interengaging shoulders against movement front and rear within the casing. In addition, the side walls of the adjoining box elements are secured together by bolts 39, see Fig. 18, which pass through apertures in the bosses 37, the ends of these bolts being housed in the bosses and leaving the side walls unobstructed. The outer side walls of the box elements E which adjoin the walls of the casing are secured to the casing by means of screws which pass through apertures in the bosses 37 and are threaded into tapped holes in the angle bars 2 or 3, as the case may be, and in the inturned portions 7a of the side plates 7, see Fig. 2, it being noted that the bosses 37 are so located in the side plates 16 of the box elements that the outer faces of the bosses at the forward and rear ends respectively of the said elements lie against the inner faces of the angle bars 2 and 3 and against the inner faces of the inturned-portions 7a of the side plates 7 of the casing. In this manner, the box elements are firmly secured not only to the casing but to each other.

It will be noted further by reference to Fig. 7 that when in the assembly one of the box elements is superimposed upon another, the contact between these elements occurs in the offset portions of the reinforcing strips 19, 22, 25 and 28, and that the superimposed box element is secured to the underlying box element by means of screws 42 which pass upwardly through the openings 27 and 32 of the top plate 15 of the underlying box element and through the apertures 33 in the reinforcing strips 25 and 28 and are threaded into the flat strips 21 and 23, which as previously described form elements of the bottom wall structure 14 of the superimposed box. As previously described, the constructions of the box elements of the groups E and D are identical.

The compartments C may also be formed by individual box elements after the manner described above, but we prefer to form these compartments in units of two. The construction of these double compartment box elements will be readily understood by reference to Fig. 7, which shows a vertical section through one of the units. The construction may be identical with the construction of the boxes D described above, with the exception that in this case a transverse partition 43 is secured by welding or in other suitable manner to and between the side walls of the box elements so as to divide the interior of this element into two compartments, each of which constitutes one of the compartments C. The partition 43 as shown in the drawings may be formed of sheet metal flanged at all sides so as to present flat surfaces at the sides for contact with the side walls of the unit and flat vertical faces 44 and 45 at the front and rear respectively, the outer faces of which are in the common plane of the flanges 17 and 27 of the box elements D and E. The lower edges of the flanges of the partitions 43 are preferably turned inwardly as shown, so that in the event that these compartments are used with drawers, the latter may find a guide at the top on these inturned portions of the flanges. It is apparent that any one of the box elements D may be replaced by one of the box elements comprising two of the compartments C, or vice versa.

It is customary in the cases of the compartments D and E to employ in conjunction therewith drawers which are slidably mounted in the compartments, as hereinafter more fully set forth. These drawers are shown in broken lines in Fig. 7, and it will be noted that they comprise at their rear ends an upstanding portion 46 which extends completely across the width of the box, and a depending rear wall portion 47 which terminates short of the upper edge of the wall portion 46 to provide an opening 48 giving access to the interior of the drawer through the open rear end of the box element in which the drawer is established. In the case of the compartments C, these drawers may or may not be employed, but if in any of these compartments the boxes are used without the drawer, we prefer to place at the rear of the box element and as shown in Fig. 7 a rear wall member 49 which may take the form of a bracket secured in position by means of screws 51 and terminating at a point below the top wall of the compartment to afford an opening for admission to the interior of the latter from the rear. The bracket 49 may have secured to its rear face a holder 52 for a name plate indicating the owner or lessee of the compartment.

As shown in Figs. 8 to 15, inclusive, the compartments B are in the present instance formed in units of eight, each of these units corresponding in size to two of the box elements containing the compartments C, previously described, placed one above the other, and in the construction shown in Fig. 1, it is, therefore, possible to replace four of the compartments C with eight of the compartments B, or vice versa. The compartments A are similarly formed in units of fifteen, and these units correspond in size to the units B, so that the unit box elements containing the compartments A and B may be substituted one for the other in the assembly. It will be noted further that the compartments A and B are of somewhat lesser depth or length than the compartments C, D and E. Each of the box elements containing the compartments A and B consists of a rectangular metallic frame or casing comprising top and bottom walls 53 and 54 and side walls 55, these walls being in the form of flat plates. The top wall 53 is provided at both the front and rear edges with a flat reinforcing strip, 56 and 57 respectively, and similar reinforcing strips 58 and 59 are provided at the front and rear edges respectively of the bottom wall 54. This bottom wall is also flanged upwardly at its rear edge, as indicated at 61 to provide a support for a name plate holder 62 which may be secured to the flange by welding or in other suitable manner. The side wall 55 of the frame is turned outwardly at its rear end and back upon itself, as indicated in Fig. 10, by the reference numeral 60. The side walls are joined to the top and bottom walls, as shown in Figs. 9, 12 and 15, by means of flanges 63 at the tops and bottoms of the side plates, which turn inwardly over the top and bottom respectively of the top and bottom plates 53 and 54 and are secured to the latter by welding or in other suitable manner. It will be noted by reference to Figs. 12 and 15 that the reinforcing bars 56 and 58 are extended at the ends beyond the side edges of the top and bottom plates 53 so that their outer end edges lie flush with the outer surfaces of the side walls 55. In this frame, the sides of the individual compartments are formed by vertical partition plates 64, which in the case of the compartments A are two in number, and in the case of the compartments B is one, see Figs. 10 and 11. These partitions are welded to the top plate 53 and the bottom plate 54, and extend into vertical slots, indicated at 65 in Figs. 10 and 11, in the upstanding flange 61 of the bottom plate 54. The forward ends of the partitions 64 are offset transversely, as indicated at 66, and to the forward portion of each of the partitions is secured a strip of metal 67, which in its forward portion is similarly offset transversely but in the opposite direction to the offset 66 of the plate. This provides a longitudinal recess in the forward edge of the partition, the function of which will be hereinafter described.

The horizontal partitions forming the tops and bottoms of the adjoining compartments are shown in Figs. 9 and 14. These partitions correspond in width to the width of the individual compartments and are secured by welding or otherwise at the sides to the panels 64 and to the side plates 55 of the casings. Each horizontal partition element consists of a flat plate 68 flanged downwardly at the front and sides, as shown in Fig. 9, and having at the rear an upstanding flange 69 corresponding to the flange 61 of the bottom plate of the casing and adapted for reception of one of the index holders 62. The forward faces of the depending flanges 71 at the fronts of these horizontal partitions occupy a common plane with the forward edge of the casing and the forward edges of the vertical partitions 64. These box elements containing the compartments A and B are secured in the main casing, as also illustrated in Fig. 9, by means of screws 72 which at the top of the first-named casings pass through apertures in the top plate 53 and through the flat reinforcing strips 57, and are threaded into the inturned portions 8a of the main casing; and at the sides similar screws pass through the turned-back portions 60 and are threaded into the apertures 41 of the inturned portions 7a of the side plates of the main casing. The box elements are secured together by means of male and female screws 74 which pass through the abutting turned-back portions 60 at the rear of the casings, and by similar screws 75 which pass through the adjoining side walls 55 of the casings, as shown in Figs. 10 and 11. Preferably the positions of these screws are reversed at front and back of the compartments so that they can be released only by access to a plurality of compartments. It will be noted that by reason of the presence at the back of the side walls 55 of the inturned portions 63, the said walls at the front of the casing are spaced apart, leaving recesses corresponding to those formed at the fronts of the partitions 64, the function of these recesses being hereinafter described. The box elements of the compartments A and B are secured to the underlying units, as shown in Fig. 9, by means of screws 76 which pass upwardly through the top walls of the underlying casings and are threaded into the reinforcing strips 58 and 59 at the under sides of the bottom plates 54 of the superimposed units.

In post office box structures of this character, each individual compartment, with the exception of those employing drawers, is provided with an independent door frame. This frame carries the hinged door which forms the closure for the front of the compartment. Conventionally, the lock is carried by the hinged door, and the latch engages behind the frame. The specific construction of these door frames, aside from their cooperative relation to the box structure previously described, forms no part of the present invention, and for the purpose of illustration they have been shown in the drawings as simple rectangular frames. Each of these door frames is adapted to abut the front edges of the individual compartments. In the case of the compartments A and B, each of the frames 71 is provided at the opposite sides with a rearwardly extending flange 78, which as shown in Figs. 9, 10 and 11 fit into the recesses between the side walls 55 of the adjoining box elements and at the fronts of the vertical partitions 64. These frames are secured in place by means of rivets (not shown) which pass through the side walls of the individual compartments and through the flanges 78. In the cases of the compartments C, D and E, and as shown in Figs. 7 and 18, the door frames are dispensed with, and the door is formed as a part of the drawer, as shown, and when closed engages the front surfaces of the flanges 17, 26 and 34 at the forward ends of the box elements. The door frames 71 are so formed, preferably, that their edges both at the sides and top abut the edges of the door frames of the adjoining compartments, as shown in Fig. 1.

It will be noted that the construction described above affords a high degree of interchangeability in the structure between the box elements containing the compartments of different sizes, and that considerable latitude is thus afforded in the choice of relative number and arrangement in the structure of the compartments of different sizes. This interchangeability, among the box elements of different sizes and shapes, is made possible by the novel arrangement of the securing members of the individual box elements in a uniform system, as described above. The provision of individual securing means for each box element is of importance since it makes possible the removal from the nest of any one or a plurality of said elements without disturbing the others, and interchange of box elements may be accomplished quickly and without complication. By maintaining in stock a supply of the box elements of different compartment size, the changing requirements of the various individual post offices may be met immediately and the alterations made without disturbance of the office routine.

Attention is also directed to the fact that the screws and bolts which secure the box elements together and in the casing are so arranged that the securing members for any one box element are accessible for release through no one compartment, and that to release a box element for withdrawal from the nest it is necessary for one to have access to a plurality of compartments. This precludes tampering or dismantling by unauthorized parties.

There may be some modification in the details of construction without departure from the invention.

We claim:

1. In a nested post office box structure, the combination with an outer casing of sheet metal, of a plurality of sheet metal box elements individually detachably mounted in said casing and jointly filling the latter, certain of said box elements being formed at their forward ends with transverse outwardly extending flanges the edges of which are adapted to abut the edges of the outwardly extending flanges of adjoining elements, others of said box elements being formed to provide at the said forward ends a space between the walls of the adjoining elements, frames having portions adapted for insertion in the said spaces between the walls of the last-named compartments and adapted to close said spaces at the forward ends of said elements whereby the structure presents a substantial uniformity of appearance when viewed from the forward ends of said box elements, and means for securing said elements to each other and to the casing to form an integrally interlocked structure in which said elements are mutually supported in and by the casing in the respective positions.

2. In a nested post office box structure, the combination with an outer casing of sheet metal, of a plurality of sheet metal box elements individually detachably mounted in said casing and jointly filling the latter, and means for securing said elements to each other and to the casing to form an integrally interlocked structure in which said elements are mutually supported in and by the casing in the respective positions, certain of said box elements comprising side walls having transverse outwardly extending flanges at their forward edges, the outer edges of said flanges being adapted to abut the corresponding flanges of adjoining elements, reinforcing strips secured to the upper and lower surfaces respectively of the top and bottom walls of said elements and at the said forward edges, said strips having portions offset from said walls and adapted for seating engagement with the offset portions of the corresponding reinforcing strips of adjoining box elements, and means associated with said reinforcing strips for securing adjoining box elements together.

3. In a nested post office box structure, the combination with an outer casing of sheet metal, of a plurality of sheet metal box elements individually detachably mounted in said casing and jointly filling the latter, and means for securing said elements to each other and to the casing to form an integrally interlocked structure in which said elements are mutually supported in and by the casing in the respective positions, certain of said box elements comprising side walls having outwardly extending flanges at their forward edges, the outer edges of said flanges being adapted to abut the corresponding flanges of adjoining elements, reinforcing strips secured to the upper and lower surfaces respectively of the top and bottom walls of said elements and at the said forward edges, said strips having portions offset from said walls and adapted for seating engagement with the offset portions of the corresponding reinforcing strips of adjoining box elements, the side walls of said box elements having pressed-out portions adapted in assembly to engage the pressed-out portions of the adjoining elements, and means associated with the said offset portions of the reinforcing strips and with the pressed-out portions of said side walls for securing the adjoining box elements together.

4. A nested post office box structure comprising an outer casing of sheet metal, a plurality of sheet metal box elements individually detachably mounted in said casing and jointly filling the latter, and means for securing said elements to each other and to the casing to form an integrally interlocked structure in which said elements are mutually supported in and by the casing in the respective positions, certain of said box elements comprising side walls having pressed-out portions forming abutments for the corresponding pressed-out portions of the side walls of adjoining box elements and having on the top and bottom walls and secured to the exterior surfaces thereof reinforcing strips comprising outwardly offset portions forming abutments for the corresponding offset portions of the reinforcing strips of adjoining box elements, and means associated with the pressed-out portions of the side walls and with the offset portions of said reinforcing strips for securing the adjoining box elements together.

5. In a nested post office box structure, the combination with an outer casing of sheet metal, of a plurality of sheet metal box elements mounted in said casing and jointly filling the latter, certain of said box elements comprising top and bottom walls having reinforcing strips secured to the outer surfaces thereof and provided with outwardly offset portions forming spaces between said strips and said walls, reinforcing strips inserted in said space, and means operatively associated with said strips for securing the box elements in the structure.

6. In a nested post office box structure, the combination with an outer casing in the form of an open rectangular frame of sheet metal, of a plurality of open-ended box elements of sheet metal individually detachably mounted in said frame and jointly filling the latter, the side walls of certain of said box elements having at their front and rear edges outwardly extending flanges adapted to abut with their outer edges the outer edges of the flanges of adjoining elements, and said side walls having intermediate pressed-out portions corresponding in depth to the width of said flanges and adapted in the structure to abut the corresponding pressed-out portions of the side walls of adjoining box elements, and means located in said pressed-out portions for securing the said adjoining elements together.

7. A nested post office box structure comprising an outer casing of sheet metal, a plurality of sheet metal box elements individually detachably mounted in said casing and jointly filling the latter, certain of said box elements comprising partitions dividing the interior thereof into a plurality of compartments, said partitions being bifurcated at the forward edges, means for spacing apart the forward ends of the side walls of the adjoining box elements, a frame for each of said compartments mounted at the front of said box element and having portions seating between the bifurcations of said partitions and in the said space between the side walls of the adjoining box elements, and means for securing the said box elements together and to said casing.

8. A nested post office box structure comprising an outer frame-like casing of sheet metal, a plurality of four-sided sheet metal box elements nested in said casing in both transverse and superimposed relation and jointly filling the casing, and means for securing said elements to each other and to the casing to form an integrally interlocked structure in which said elements are mutually supported in and by the casing in the respective positions, the securing means for each element being independent, at least in part, of the securing means for each of the adjoining elements whereby said elements may be individually released and withdrawn from the structure without disturbance of the interlocked and intersupported relation of the remaining portions of the structure, said elements each comprising one or a plurality of compartments and being dimensioned and constructed with respect to each other and to said securing means so that each of the elements is interchangeable in the nest with an element containing a lesser number of compartments or with a plurality of elements of lesser individual compartment size whereby the nest as a whole is highly adjustable in respect to the relative numbers therein of the compartments of different sizes, and said securing means being plural for each box element and being arranged so that access to different ones thereof may be had only by way of different compartments whereby removal of any one of said elements requires access to a plurality of said compartments.

FRANK E. SAGENDORPH, 2nd.
CLARENCE E. BAITTINGER.